United States Patent [19]

Sakai

[11] Patent Number: 4,803,582
[45] Date of Patent: Feb. 7, 1989

[54] PERPENDICULAR MAGNETIZATION TYPE MAGNETIC HEAD HAVING A MAGNETIC POLE PART WHICH FORMS A CLOSED MAGNETIC PATH

[75] Inventor: Kunihide Sakai, Ebina, Japan

[73] Assignee: Victor Company of Japan Ltd., Kenagawa, Japan

[21] Appl. No.: 630,660

[22] Filed: Jul. 16, 1984

[30] Foreign Application Priority Data

Jul. 19, 1983 [JP] Japan ................................. 58-111981

[51] Int. Cl.$^4$ .............................................. G11B 5/23
[52] U.S. Cl. ..................................... 360/119; 360/122
[58] Field of Search .................... 360/119, 110–113, 360/121–127; 29/603

[56] References Cited

U.S. PATENT DOCUMENTS 4,222,084  9/1980  Nakagawa et al. .................. 360/119

FOREIGN PATENT DOCUMENTS 0070907  2/1983  European Pat. Off. .
3213928  11/1982  Fed. Rep. of Germany .
2532458  3/1984  France .
0101020  6/1984  Japan ................................. 360/113
0963219  7/1964  United Kingdom ................ 360/119

OTHER PUBLICATIONS

Patent Abstracts of Japan, vol. 6, No. 206, Oct. 19, 1982; & JPA-A-57-111821.
Patent Abstracts of Japan, vol. 1, No. 123, Oct. 17, 1977, p. 5152 E 77; & JP-A-52-55513.

Primary Examiner—Stuart N. Hecker
Assistant Examiner—David J. Severin
Attorney, Agent, or Firm—Roberts, Spiecens & Cohen

[57] ABSTRACT

A perpendicular magnetization type magnetic head comprises a main magnetic pole part wound with a coil, for subjecting a magnetic recording medium to magnetic fluxes which pass perpendicularly through a magnetic layer of the magnetic recording medium, a non-magnetic part located on both sides of the main magnetic pole and adjacent to the magnetic recording medium, so as to sandwich the main magnetic pole, and a closed magnetic path forming magnetic pole part for forming a closed magnetic path of the magnetic flux with respect to the main magnetic pole part. The closed magnetic path forming magnetic pole part has an edge which is bounded on the non-magnetic part. This edge is non-parallel to the main magnetic pole part.

8 Claims, 2 Drawing Sheets

4,803,582

PERPENDICULAR MAGNETIZATION TYPE MAGNETIC HEAD HAVING A MAGNETIC POLE PART WHICH FORMS A CLOSED MAGNETIC PATH

BACKGROUND OF THE INVENTION

The present invention generally relates to perpendicular magnetization type magnetic heads which perform recording and reproduction by magnetizing a magnetic layer of a magnetic medium in a perpendicular direction, and more particularly to a perpendicular or vertical magnetization type magnetic head having a main magnetic pole and return a path magnetic pole or poles.

Generally, when performing recording and reproduction with respect to a magnetic recording medium by use of a magnetic head, the so-called longitudinal direction recording system is employed. According to the longitudinal direction recording system, a ring type magnetic head performs the recording by magnetizing a magnetic layer of the medium in the longitudinal or horizontal direction of the medium and the magnetic head performs the reproduction by scanning over the longitudinally magnetized magnetic layer of the medium. However, as the recording is performed with higher densities, the demagnetization force acting on the residual magnetism (remanence) becomes larger. There is a problem in that this demagnetization force introduces undesirable effects on the high density recording.

Accordingly, a perpendicular magnetization type head was proposed to eliminate the above undesirable effects. The perpendicular magnetization type head magnetizes the magnetic layer of the medium in the perpendicular direction (vertical or thickness direction) of the magnetic layer. According to this perpendicular magnetization type head, the recording density can be improved, and the demagnetization force is small. Theoretically, the demagnetization force does not act on the residual magnetism, and it is possible to satisfactorily perform the high density recording.

As one kind of the perpendicular magnetization type head, there is a proposed magnetic head comprising a main magnetic pole and an auxiliary magnetic pole disposed opposing the main magnetic pole. The magnetic medium is positioned between the main magnetic pole and the auxiliary magnetic pole of the magnetic head, and the magnetic layer of the magnetic medium is magnetized in the perpendicular direction thereof by the magnetic field which is generated between the main magnetic pole and the auxiliary magnetic pole. However, according to this magnetic head, it requires a troublesome operation of inserting the magnetic medium between the main magnetic pole and the auxiliary magnetic pole of the magnetic head. There is a disadvantage in that it is especially difficult to employ this magnetic head as a rotary head of a video signal recording and reproducing apparatus (so-called video tape recorder or VTR).

In order to overcome the disadvantages of the above proposed magnetic head, another perpendicular or vertical magnetization type magnetic head was proposed. This other proposed magnetic head comprises a main magnetic pole and return path magnetic poles, as will be described later on in the specification in conjunction with drawings. This other proposed magnetic head uses a magnetic tape having a high permeability layer formed on a base, and a perpendicular magnetization layer formed on top of the high permeability layer. According to this other proposed magnetic head, the thin main magnetic pole is sandwiched between a pair of non-magnetic members and a pair of ferromagnetic members, and the outer sides thereof are sandwiched by the return path magnetic poles which are made of a ferromagnetic material. In this other proposed magnetic head, a magnetic flux is formed through a magnetic path which starts from the main magnetic pole, perpendicularly passes the perpendicular magnetization layer of the magnetic tape, passes the high permeability layer in the longitudinal direction of the magnetic tape, and then returns to the main magnetic pole through the return path magnetic poles. The recording is thus performed by the residual magnetism which are formed perpendicularly in the perpendicular magnetization layer.

According to this other proposed magnetic head, the perpendicular magnetic recording of a desired signal in a desired signal band is performed by the main magnetic pole. However, spurious or false gaps are formed between the main magnetic pole and the edges of the return path magnetic poles, and there is a disadvantage in that unwanted signals having frequencies which are dependent of the width of the false gaps are also recorded inevitably. The unwanted signals which are recorded inevitably, are noise components with respect to the desired recording and reproducing signal. In a case where the desired recording and reproducing signal is a video signal, there is a disadvantage in that the above noise components are conspicuous in the reproduced picture.

SUMMARY OF THE INVENTION

Accordingly, it is a general object of the present invention to provide a novel and useful perpendicular magnetization type magnetic head in which the disadvantages described heretofore have been overcome.

Another and more specific object of the present invention is to provide a perpendicular magnetization type magnetic head which is designed so that undesirable effects of false gaps formed between a main magnetic pole and a return path magnetic pole or poles, are reduced to an extent so that the undesirable effects are negligible from the practical point of view. More specifically, the object of the present invention is to provide a perpendicular magnetization type magnetic head in which the edges of the return path magnetic poles opposing the main magnetic pole are not parallel to the main magnetic pole. According to the magnetic head of the present invention, the frequency distribution of unwanted signals which are inevitably recorded due to false gaps between the main magnetic pole and the edges of the return path magnetic poles, is widened. For this reason, the levels of the unwanted signals which are inevitably recorded, are greatly reduced by the widened frequency distribution of the unwanted signals. As a result, the levels of the unwanted signals which are inevitably recorded due to the false gaps and act as noise components, are reduced to an extent so that the noise components are small and negligible from the practical point of view. Therefore, even when a video signal is recorded and reproduced by the magnetic head of the present invention, the noise components which appear in the reproduced picture due to the false gaps are small and inconspicuous.

Other objects and further features of the present invention will be apparent from the following detailed

DETAILED DESCRIPTION

Figure 1A:
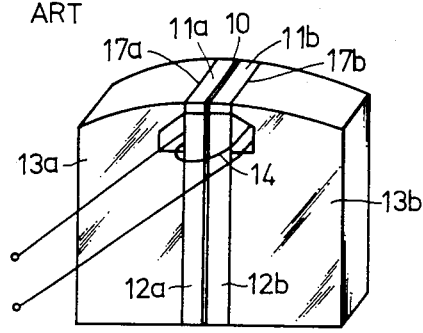
FIGS. 1A and 1B are a perspective view and a plan view, respectively showing an example of a conventional perpendicular magnetization type magnetic head.
Figure 1B:
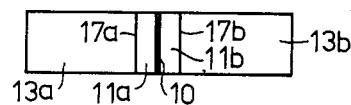

The conventional perpendicular or vertical magnetization type magnetic head has a construction shown in FIGS. 1A and 1B. A main magnetic pole 10 is made from a ferromagnetic material, and is sandwiched on both sides thereof between a pair of non-magnetic members 11a and 11b and a pair of ferromagnetic members 12a and 12b. The main magnetic pole 10 is further sandwiched between return path magnetic poles 13a and 13b which are made of a ferromagnetic material and are located on both sides of the non-magnetic members 11a and 11b and the ferromagnetic members 12a and 12b. A coil 14 is wound on the ferromagnetic members 12a and 12b, at a position closer to the tip ends of the ferromagnetic members 12a and 12b.

Figure 2:
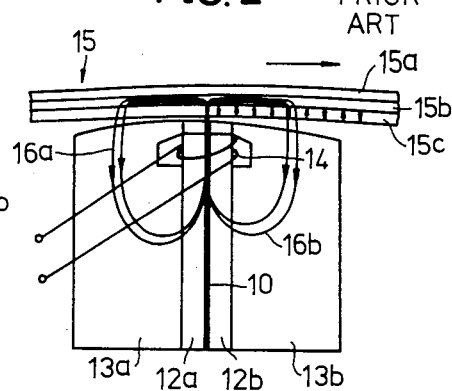
FIG. 2 is a diagram for explaining the operating principle of the perpendicular magnetization type magnetic head.

A magnetic tape 15 is shown in FIG. 2, with the thickness of the magnetic tape 15 largely exaggerated for convenience' sake. A high permeability layer 15b is formed on a base 15a of the magnetic tape 15, and a perpendicular magnetization layer 15c is formed on top of the high permeability layer 15b. When a signal current is passed through the coil 14, a magnetic flux which passes a closed magnetic path as shown by arrows 16a and 16b in FIG. 2 is generated. The closed magnetic path starts from the main magnetic pole 10, perpendicularly passes the perpendicular magnetization layer 15c of the magnetic tape 15, passes the high permeability layer 15b in the longitudinal direction of the magnetic tape 15, and then returns to the main magnetic pole 10 through the return path magnetic poles 13a and 13b and the ferromagnetic members 12a and 12b. The recording is thus performed by the residual magnetism which are formed perpendicularly (in the thickness direction) in the perpendicular magnetization layer 15c.

Figure 7:
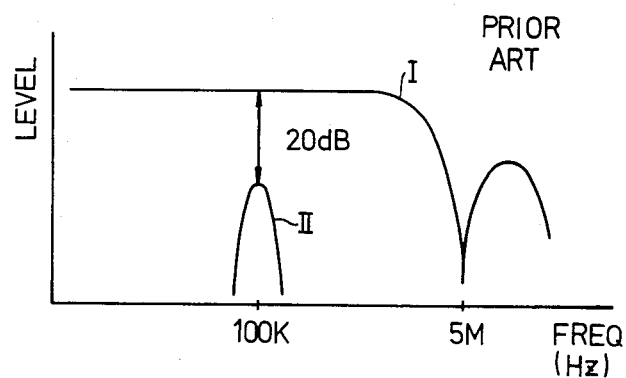
FIG. 7 shows a recording and reproducing frequency characteristic of the conventional magnetic head shown in FIGS. 1A and 1B.

However, in addition to the magnetic recording of the desired signal performed by the main magnetic pole 10, unwanted signals are inevitably recorded due to false gaps formed between the main magnetic pole 10 and the edges of the return path magnetic poles 13a and 13b. The unwanted signals have frequencies dependent on the width of the false gaps, and act as noise components. The recording and reproducing frequency characteristic of the conventional magnetic head is shown in FIG. 7. The desired signal is recorded and reproduced by the main magnetic pole 10 with a frequency characteristic indicated by a curve I In addition, due to the false gaps formed between the main magnetic pole 10 and the edges of the return path magnetic poles 13a and 13b, the unwanted signals having a peak at a frequency (100 kHz in the example shown in FIG. 7) which is dependent on the width (for example, 25 μm) of the false gaps are recorded and reproduced with a frequency characteristic indicated by a curve II.

In the conventional magnetic head, edges 17a and 17b of the return path magnetic poles 13a and 13b, are bounded on the respective non-magnetic members 11a and 11b and oppose the main magnetic pole 10. As shown in FIGS. 1A and 1B, these edges 17a and 17b are parallel to the main magnetic pole 10. For this reason, the unwanted signals having frequencies dependent on the width of the false gaps between the main magnetic pole 10 and the edges 17a and 17b, are recorded and reproduced for the entire width of a track which is recorded on the magnetic tape 15 by the conventional magnetic head. Further, in addition to the reproduction of the desired signal by the main magnetic pole 10, crosstalk components having frequencies dependent on the width of the false gaps are also reproduced. The levels of the unwanted signals are lower than the recording and reproducing levels of the desired signal which is recorded and reproduced, but the level difference between the desired signal and the unwanted signals is in the range of 20 dB. Therefore, in a case where the desired signal which is recorded and reproduced is a video signal, the unwanted signals are conspicuous in the reproduced picture, and there is a disadvantage in that the picture quality of the reproduced picture is poor due to the unwanted signals.

The present invention has overcome this disadvantage, and a first embodiment of the perpendicular or vertical magnetization type magnetic head according to the present invention will be described in conjunction with FIGS. 3A and 3B. A main magnetic pole 20 is made of a ferromagnetic material having a high magnetic flux density with a saturation magnetic flux density of over 10,000 gauss, and is an amorphous film of the CO.Zr.Nb system having a thickness of 1 μm, for example. Non-magnetic members 21a and 21b are made from a crystalline glass or ceramics, for example, and sandwich the tip end part of the main magnetic pole 20 from both sides of the main magnetic pole 20. Ferromagnetic members 22a and 22b are made from a metal oxide ferrite such as MnZn single/crystal ferrite, for example, and constitute a yoke part which also sandwich the main magnetic pole 20 from both sides of the main magnetic pole 20. Return path magnetic poles 23a and 23b sandwich the non-magnetic members 21a and 21b and the ferromagnetic members 22a and 22b from both sides thereof. The return path magnetic poles 23a and 23b are made from a ferromagnetic material such as the MnZn single/crystal ferrite, as in the case of the ferromagnetic members 22a and 22b. A coil 24 is wound around the ferromagnetic members 22a and 22b in the vicinity of the tip ends thereof, for 50 turns, for example.

The non-magnetic members 21a and 21b and the ferromagnetic members 22a and 22b each have a side surface which is formed into a concave cylindrical surface by a lapping process, so that the minimum distance to the main magnetic pole 20 is 25 μm and the maximum distance to the main magnetic pole 20 is 100 μm. In addition, the side surfaces of the return path magnetic poles 23a and 23b in contact with the respective non-magnetic members 21a and 21b and the respective ferromagnetic members 22a and 22b, are formed into convex cylindrical surfaces by a lapping process, so that the convex cylindrical surfaces of the return magnetic poles 23a and 23b match the concave cylindrical surfaces of the respective non-magnetic members 21a and 21b and the respective ferromagnetic members 22a and 22b. Accordingly, edges 25a and 25b of the return path magnetic poles 23a and 23b, which are bounded on the respective non-magnetic members 21a and 21b and oppose the main magnetic pole 10, are arcuate.

Figure 3A:
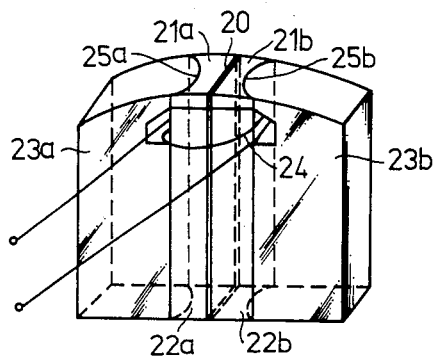
FIGS. 3A and 3B are a perspective view and a plan view, respectively showing a first embodiment of a perpendicular magnetization type magnetic head according to the present invention.
Figure 3B:
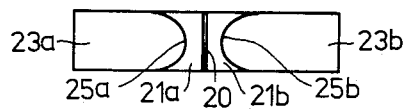
Figure 8:
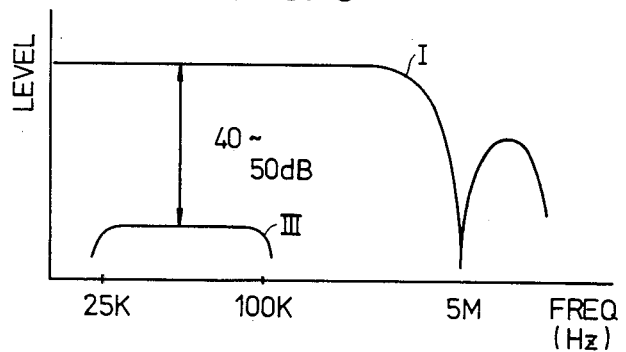
FIG. 8 shows a recording and reproducing frequency characteristic of the magnetic head according to the present invention shown in FIGS. 3A and 3B.

When the recording is performed with respect to the magnetic tape 15 shown in FIG. 2 by use of the magnetic head shown in FIGS. 3A and 3B, the desired signal is recorded with a high density by the main magnetic pole 20 with a characteristic indicated by a curve I in FIG. 8. When this recording is performed, the unwanted signals are inevitably recorded due to the false gaps formed between the main magnetic pole 20 and the edges 25a and 25b of the return magnetic poles 23a and 23b. However, the edges 25a and 25b of the return path magnetic poles 23a and 23b, are not parallel to the main magnetic poles 20. In other words, the width of the false gaps between the edges 25a and 25b and the main magnetic pole 20, differs at each position along the width direction of the track which is formed on the magnetic tape 15. The width of the false gaps differ in a range of 25 μm to 100 μm, for example. Thus, the unwanted signals which are inevitably recorded due to the false gaps, are distributed in a frequency range of 25 kHz to 100 kHz, for example, as indicated by a curve III in FIG. 8. However, the levels of the unwanted signals are extremely small, and the level difference between the desired signal and the unwanted signals falls in a range of 40 dB to 50 dB, for example. Because the levels of the unwanted signals which are inevitably recorded due to the false gaps, are extremely small, the unwanted signals which appear as noise components in the reproduced picture in a case where the desired signal is the video signal, are inconspicuous in the reproduced picture. Therefore, the effects of the noise components which are generated by the false gaps, are negligible from the practical point of view, even in the case where the desired signal is the video signal.

A concrete example of numerical values will now be given according to which a desirable result was obtained. In this concrete example, the thickness of the main magnetic pole 20 is 1 μm, the minimum distance between the main magnetic pole 20 and the edges 25a and 25b of the return path magnetic poles 23a and 23b is 25 μm, the maximum distance between the main magnetic pole 20 and the edges 25a and 25b of the return path magnetic poles 23a and 23b is 100 μm, the track width (the thickness of the return path magnetic poles 23a and 23b) of the track which is formed on the magnetic tape 15 by the main magnetic pole 20 is 100 μm, the distance between the tip and rear ends of the main magnetic poles 20 is 2.0 mm, the thickness of the non-magnetic members 21a and 21b is 20 μm to 30 μm, and the distance between the outer side surfaces of the return path magnetic poles 23a and 23b is 2.4 mm.

The object of the present invention may be achieved when the edges 25a and 25b of the return path magnetic poles 23a and 23b are not parallel to the main magnetic pole 20. Hence, as in the case of a second embodiment shown in FIG. 4, edges of non-magnetic members 30a and 30b and return path magnetic poles 31a and 31b which sandwich the main magnetic pole 20, may be an oblique straight line. In this second embodiment, edges 32a and 32b of the return path magnetic poles 31a and 31b are oblique to the main magnetic pole 20 and are therefore not parallel to the main magnetic pole 20. Accordingly, the width of the false gaps formed between the main magnetic pole 20 and the edges 32a and 32b is different at each position along the width direction of the track which is formed on the magnetic tape 15, and the effects of this second embodiment are the same as the effects of the first embodiment described before.

Figure 5:
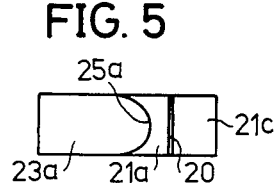

It is not essential to provide a return path magnetic pole on both sides of the main magnetic pole. As in the case of a third embodiment shown in FIG. 5, the return path magnetic pole 23b of the first embodiment shown in FIGS. 3A and 3B may be omitted. In this case, the outer side surface of a non-magnetic member 21c which provided on the side with no return path magnetic pole, need not have a concave cylindrical shape and may have a flat shape as shown in FIG. 5. Similarly, the outer side surface of a ferromagnetic member (not shown) which is located below the non-magnetic member 21c, need not have a concave cylindrical shape and may have a flat shape.

Figure 4:
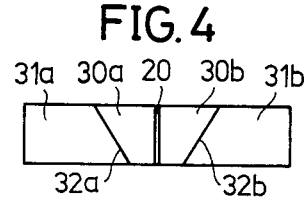
FIGS. 4, 5, and 6 are plan views respectively showing second, third, and fourth embodiments of a perpendicular magnetization type magnetic head according to the present invention.
Figure 6:
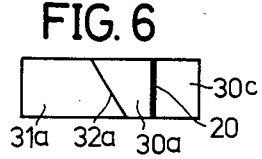

FIG. 6 shows a fourth embodiment in which the return path magnetic pole 31b of the second embodiment shown in FIG. 4 is omitted. In this case, the outer side surfaces of a non-magnetic member 30c and a ferromagnetic member (not shown) located below the non-magnetic member 30c, need not have a concave cylindrical shape and may have a flat shape.

Further, the present invention is not limited to these embodiments, but various variations and modifications may be made without departing from the scope of the present invention.

What is claimed is:

1. A perpendicular magnetization type magnetic head comprising:
   a main magnetic pole part wound with a coil, for subjecting a magnetic recording medium to magnetic fluxes which pass perpendicularly through a magnetic layer of the magnetic recording medium;
   a non-magnetic part located on both sides of said main magnetic pole and adjacent to said magnetic recording medium, so as to sandwich said main magnetic pole; and
   a closed magnetic path forming magnetic pole part for forming a closed magnetic path of said magnetic flux with respect to said main magnetic pole part,
   said closed magnetic path forming magnetic pole part having an edge which is bounded on said non-magnetic part, said edge facing the recording medium and being non-parallel to said main magnetic pole part.

2. A magnetic head as claimed in claim 1 in which a tip end of said main magnetic pole part is linear, and said edge of said closed magnetic path forming magnetic pole part is arcuate.

3. A magnetic head as claimed in claim 1 in which a tip end of said main magnetic pole part is linear, and said edge of said closed magnetic path forming magnetic pole part is oblique to said main magnetic pole part.

4. A magnetic head as claimed in claim 1 in which said closed magnetic path forming magnetic pole part comprises a ferromagnetic part constituting a yoke part which sandwich said main magnetic pole part from both sides of said main magnetic pole part together with said non-magnetic part, and a return path magnetic pole part adjacent to outer sides of said non-magnetic part and said ferromagnetic part, said return path magnetic pole part has an edge which is bounded on said non-magnetic part, and said edge of said return path magnetic pole part is non-parallel to said main magnetic pole part.

5. A magnetic head as claimed in claim 4 in which said non-magnetic part and said ferromagnetic part each have a cylindrical side surface, and a side surface of said return path magnetic pole part adjacent to said non-magnetic part and to said ferromagnetic part has a cylindrical shape complementary to the respective cylindrical side surfaces of said non-magnetic part and said ferromagnetic part.

6. A magnetic head as claimed in claim 4 in which said non-magnetic part and said ferromagnetic part each have an oblique side surface which is non-parallel to said main magnetic pole part, and a side surface of said return path magnetic pole part adjacent to said non-magnetic part and to said ferromagnetic part has a shape complementary to the respective oblique side surfaces of said non-magnetic part and said ferromagnetic part.

7. A magnetic head as claimed in claim 4 in which said non-magnetic part comprises a pair of non-magnetic members, said ferromagnetic part comprises a pair of ferromagnetic members, and said return path magnetic pole part comprises a pair of return path magnetic pole members which sandwich said non-magnetic members and said ferromagnetic members.

8. A magnetic head as claimed in claim 4 in which said non-magnetic part comprises a pair of non-magnetic members, said ferromagnetic part comprises a pair of ferromagnetic members, and said return path magnetic pole part comprises a single return path magnetic pole member located adjacent to a side surface of one of said non-magnetic members and to a side surface of one of said ferromagnetic members.

* * * * *